US012131286B2

(12) United States Patent
Nelson et al.

(10) Patent No.: US 12,131,286 B2
(45) Date of Patent: Oct. 29, 2024

(54) SYSTEMS AND METHODS FOR COMMUNICATIONS FOR ADVANCED REORDERING SYSTEMS

(71) Applicant: CO2 Exchange, LLC, Seymour, WI (US)

(72) Inventors: Michael D. Nelson, Mosinee, WI (US); Robert H. Ernest, Green Bay, WI (US); Dean W. Henrickson, Appleton, WI (US); Jordan Vohwinkel, Green Bay, WI (US)

(73) Assignee: CO2 Exchange, LLC, Seymour, WI (US)

( * ) Notice: Subject to any disclaimer, the term of this patent is extended or adjusted under 35 U.S.C. 154(b) by 73 days.

(21) Appl. No.: 17/542,934

(22) Filed: Dec. 6, 2021

(65) Prior Publication Data

US 2022/0180313 A1    Jun. 9, 2022

Related U.S. Application Data

(60) Provisional application No. 63/122,423, filed on Dec. 7, 2020.

(51) Int. Cl.
*G06Q 10/0837* (2023.01)
*G06F 9/54* (2006.01)
*G06F 16/9535* (2019.01)

(52) U.S. Cl.
CPC ......... *G06Q 10/0837* (2013.01); *G06F 9/542* (2013.01); *G06F 16/9535* (2019.01)

(58) Field of Classification Search
CPC .. G06Q 10/0837; G06F 16/9535; G06F 9/542
USPC ......................................................... 705/340
See application file for complete search history.

(56) References Cited

U.S. PATENT DOCUMENTS

| | | | |
|---|---|---|---|
| 6,405,178 B1 | 6/2002 | Manchala et al. | |
| 8,190,449 B2 | 5/2012 | Grady et al. | |
| 8,311,895 B1 | 11/2012 | Murugan et al. | |
| 9,292,824 B1 * | 3/2016 | Freeman | G06K 19/06037 |
| 9,990,605 B2 | 6/2018 | Harcar et al. | |
| 10,248,987 B1 | 4/2019 | Chandra et al. | |
| 10,296,964 B1 | 5/2019 | Rausch et al. | |
| 10,402,779 B2 | 9/2019 | Mai | |
| 10,496,951 B1 * | 12/2019 | Kandukuri | G06Q 10/0837 |

(Continued)

OTHER PUBLICATIONS

"Sustainability of reusable packaging-current situation and trends" Published by Elsevier (Year: 2020).*

(Continued)

*Primary Examiner* — Zeina Elchanti
(74) *Attorney, Agent, or Firm* — Armstrong Teasdale LLP

(57) ABSTRACT

A system is provided. The system including a computer device including at least one processor in communication with at least one memory device. The at least one processor is programmed to: receive an order from customer for a product, associate the order with an account associated with the customer, generate return shipping label with unique identification number, ship order with return shipping label and exchange box, receive a message from a shipping computer indicating that the exchange box with the return shipping label has shipped, determine customer account associated with return shipping label, and automatically reorder at least a portion of the order for the customer account.

19 Claims, 5 Drawing Sheets

(56) References Cited

U.S. PATENT DOCUMENTS

| | | | |
|---|---|---|---|
| 10,769,708 | B2 | 9/2020 | Alvo et al. |
| 10,817,832 | B1 | 10/2020 | Agrawal et al. |
| 2003/0009396 | A1 | 1/2003 | DeVries et al. |
| 2008/0033849 | A1 | 2/2008 | Rhea |
| 2008/0169343 | A1 | 7/2008 | Skaaksrud et al. |
| 2015/0227886 | A1* | 8/2015 | Peters ................ G06Q 10/0832 |
| | | | 705/332 |
| 2017/0046773 | A1 | 2/2017 | Hendricks, II et al. |
| 2017/0109772 | A1 | 4/2017 | Sundman et al. |
| 2017/0124511 | A1 | 5/2017 | Mueller et al. |
| 2017/0364860 | A1 | 12/2017 | Wilkinson et al. |
| 2018/0308047 | A1 | 10/2018 | Wardell et al. |
| 2018/0349918 | A1 | 12/2018 | Han et al. |
| 2019/0077557 | A1 | 3/2019 | Visser et al. |
| 2019/0375592 | A1 | 12/2019 | Von Bischhoffshausen et al. |
| 2020/0302374 | A1 | 9/2020 | Kang et al. |
| 2020/0302388 | A1 | 9/2020 | Merle |
| 2022/0058725 | A1* | 2/2022 | Knowlton ............ G06Q 10/087 |

OTHER PUBLICATIONS

International Search Report and Written Opinion for Patent Application PCT/US21/62026 mailed Mar. 1, 2022; 6 pp.

\* cited by examiner

SYSTEMS AND METHODS FOR COMMUNICATIONS FOR ADVANCED REORDERING SYSTEMS

RELATED APPLICATIONS

This application claims priority to U.S. Provisional Patent Application No. 63/122,423, filed Dec. 7, 2020, entitled "SYSTEMS AND METHODS FOR ADVANCED REORDERING SYSTEMS," the entire contents and disclosure of which are hereby incorporated by reference herein in their entirety.

FIELD OF THE DISCLOSURE

The field of the invention relates generally to communications for advanced reordering systems, and more specifically, to a system and method for the computer communications and interactions between multiple systems for automatically reordering and shipping supplies.

BACKGROUND

In many different reordering "clubs" or other automatic reordering systems, the consumer is sent additional supplies based on time, where a new set of supplies are sent after a predetermined period of time has occurred. In some of these systems, the period of time is reprogrammable. However, the consumer is sent additional product whether or not the consumer actually needs additional product. This can lead to a consumer have more of a product than they need, which can expire or spoil before the client gets a chance to actually use the product. Furthermore, many supplies are sent in recyclable containers. While, the containers may be recycled with municipal recycling, this is not the most efficient. In many of these cases, the supplies can be more efficiently sterilized and reused by the supplier.

Accordingly, an improved system and method of reordering that encourages returning empty containers is desirable.

BRIEF DESCRIPTION

In at least one aspect, a system is provided. The system including a computer device including at least one processor in communication with at least one memory device, at least one database, and a shipper computer device associated with a shipper. The at least one processor is programmed to receive an order from a customer for a product. The order is associated with a customer account associated with the customer. The at least one processor is also programmed to perform at least one advanced programming interface call to retrieve a unique identification number from the shipper computer device. The at least one processor is further programmed to generate and print a return shipping label with the unique identification number. In addition, the at least one processor is programmed to generate and provide instructions to ship the order with the return shipping label and an exchange box. Moreover, the at least one processor is programmed to receive, from the shipper computer device via at least one of an API call and a push notification, a message indicating that the exchange box with the return shipping label has shipped. The message includes the unique identification number. Furthermore, the at least one processor is programmed to generate one or more database queries to retrieve customer account information from the at least one database based on the unique identification number. In addition, the at least one processor is also programmed to compare results of the one or more database queries to identify the customer account associated with the unique identification number. In addition, the at least one processor is further programmed to generate a reorder for at least a portion of the order for the customer account in response to receiving the message. The system may have additional, less, or alternate functionality, including that discussed elsewhere herein.

In another aspect, a computer device is provided. The computer device includes at least one processor in communication with at least one memory device, at least one database, and a shipper computer device associated with a shipper. The at least one processor is programmed to receive, from the shipper computer device via at least one of an API call and a push notification, a first message indicating that a first reorder return shipping label has shipped. The first message includes a first unique identification number. The at least one processor is also programmed to generate one or more database queries to retrieve customer account information from the at least one database based on the first unique identification number. The at least one processor is further programmed to compare results of the one or more database queries to identify a customer account associated with the first unique identification number. The at least one processor is moreover programmed to generate a first reorder for at least a portion of a previous order for the customer account in response to receiving the first message. In addition, the at least one processor is programmed to perform at least one advanced programming interface (API) call to retrieve a second unique identification number from the shipper computer device for the first reorder. In addition, the at least one processor is also programmed to generate and print a second reorder return shipping label with the second unique identification number. In addition, the at least one processor is further programmed to generate and provide instructions to ship the first reorder with the second reorder return shipping label and a first reorder exchange box. In addition, the at least one processor is moreover programmed to receive, from the shipper computer device via at least one of an API call and a push notification, a second message indicating that the first reorder exchange box with the second reorder return shipping label has shipped. The second message includes the second unique identification number. Moreover, the at least one processor is programmed to generate one or more database queries to retrieve customer account information from the at least one database based on the second unique identification number. Moreover, the at least one processor is also programmed to compare results of the one or more database queries to identify the customer account associated with the second unique identification number. Moreover, the at least one processor is further programmed to generate a second reorder for at least a portion of the first reorder for the customer account in response to receiving the second message. The computer device may have additional, less, or alternate functionality, including that discussed elsewhere herein.

In a further aspect, a method is provided. The method is implemented by a computer device comprising at least one processor in communication with at least one memory device, at least one database, and a shipper computer device associated with a shipper. The method includes receiving an order from a customer for a product. The order is associated with a customer account associated with the customer. The method also includes performing at least one advanced programming interface call to retrieve a unique identification number from the shipper computer device. The method further includes generating and print a return shipping label with the unique identification number. In addition, the method includes generating and providing instructions to ship the order with the return shipping label and an exchange box. Moreover, the method includes receiving, from the shipper computer device via at least one of an API call and a push notification, a message indicating that the exchange box with the return shipping label has shipped. The message includes the unique identification number. Furthermore, the method includes generating one or more database queries to retrieve customer account information from the at least one database based on the unique identification number. In addition, the method also includes comparing results of the one or more database queries to identify the customer account associated with the return shipping label. In addition, the method further includes generating a reorder for at least a portion of the order for the customer account in response to receiving the message. The method may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
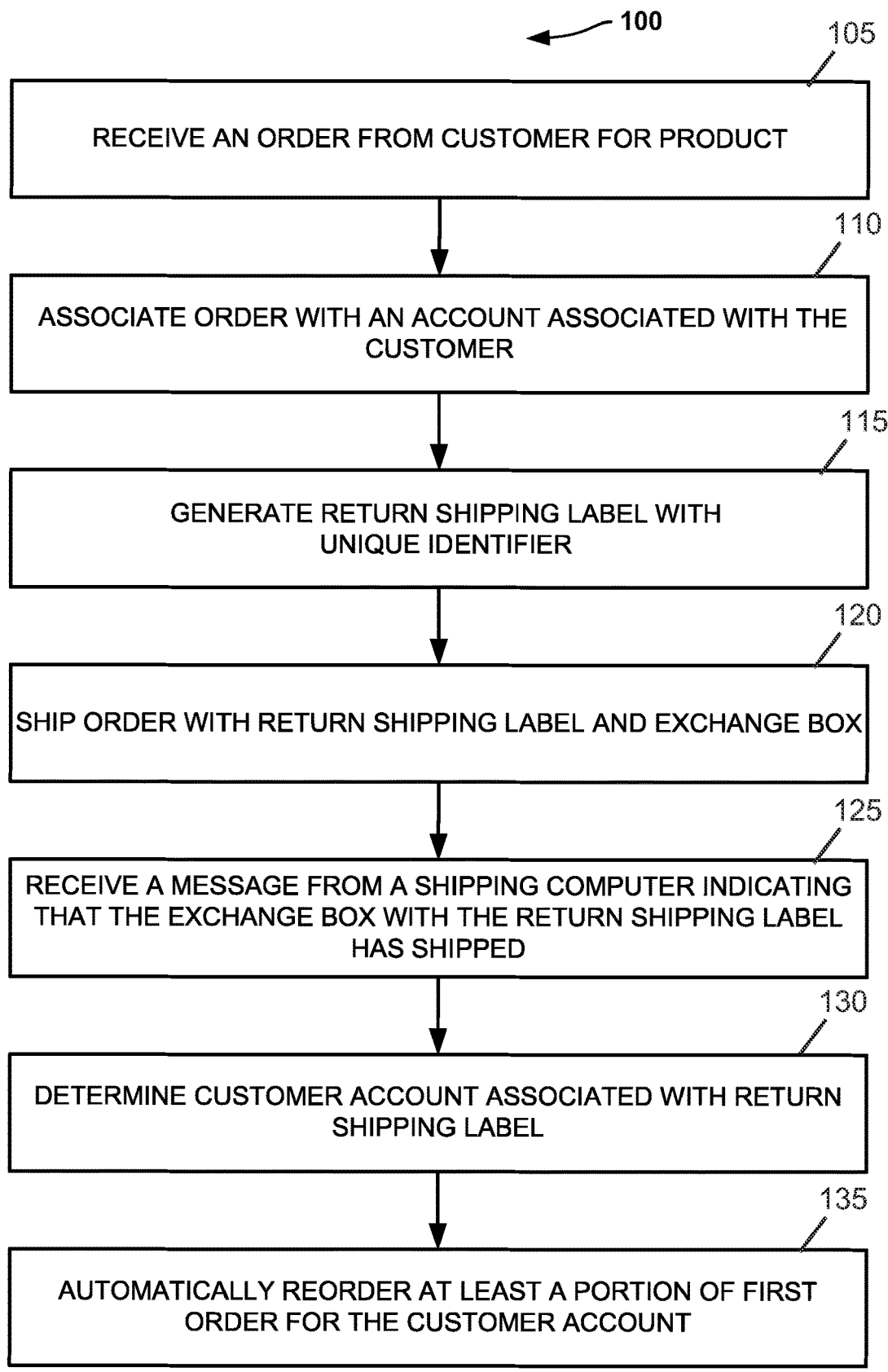
FIG. 1 is a flowchart of a first process for automatic reordering in accordance with at least one embodiment of the disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for communications for advanced reordering systems, and more specifically, to a system and method for the computer communications and interactions between multiple systems for automatically reordering and shipping supplies. In an exemplary embodiment, the process is performed by an order processing computer device in communication with a plurality of computer devices.

At least one of the technical problems addressed by this system may include: (i) reduced time for reordering products; (ii) reduced required customer time to interact for reordering; (iii) improved accuracy in product reordering; and (iv) automating reordering of consumable products to ensure they are provided when customers need them.

The methods and systems described herein may be implemented using computer programming or engineering techniques including computer software, firmware, hardware, or any combination or subset thereof, wherein the technical effects may be achieved by performing at least one of the following steps: a) receive an order from a customer for a product, wherein the order is associated with a customer account associated with the customer, wherein the order is for one or more products in reusable containers, wherein the order is for one or more consumable products; b) perform at least one advanced programming interface (API) call to retrieve a unique identification number from the shipper computer device, wherein the unique identification number is a tracking number assigned to the return shipping label; c) generate and print a return shipping label with the unique identification number; d) generate and provide instructions to ship the order with the return shipping label and an exchange box, wherein the exchange box includes one or more empty reusable containers when shipped by the customer, the exchange box is an exchange postcard, wherein the return shipping label is attached to the exchange postcard; e) receive, from the shipper computer device via at least one of an API call and a push notification, a message indicating that the exchange box with the return shipping label has shipped, wherein the message includes the unique identification number, wherein the shipper computer device receives scan information of a scan of the return shipping label, when the exchange box is shipped by the customer; f) generate one or more database queries to retrieve customer account information from the at least one database based on the unique identification number; g) compare results of the one or more database queries to identify the customer account associated with the unique identification number; h) generate a reorder for at least a portion of the order for the customer account in response to receiving the message, wherein an amount of products in the reorder is based on a number of reusable containers that may fit in the exchange box and a number of products in the order; i) receive the order from a web commerce computer device, wherein the customer placed the order via the web commerce computer device; j) associate the unique identification number with the order; k) store the unique identification number in the at least one database with the customer account; and l) generate the one or more database queries to search the at least one database using the unique identification number as a key variable.

In some embodiments, the technical effects may be achieved by performing at least one of the following steps: a) perform at least one advanced programming interface (API) call to retrieve a new unique identification number from the shipper computer device for the reorder; b) generate and print a reorder return shipping label with the new unique identification number; c) generate and provide instructions to ship the reorder with the reorder return shipping label and a reorder exchange box; d) receive, from the shipper computer device via at least one of an API call and a push notification, a second message indicating that the reorder exchange box with the reorder return shipping label has shipped, wherein the second message includes the new unique identification number; e) generate one or more database queries to retrieve customer account information from the at least one database based on the new unique identification number; f) compare results of the one or more database queries to identify the customer account associated with the new unique identification number; and g) generate a second reorder for at least a portion of the reorder for the customer account in response to receiving the second message.

FIG. 1 is a flowchart of a first process 100 for automatic reordering in accordance with at least one embodiment of the disclosure. In the exemplary embodiment, process 100 is performed by one or more computing devices, such as but not limited to, a web commerce computer device 320, a shipping computer device 330, and an order processing (OP) computer device 325 (all shown in FIG. 3).

In the exemplary embodiment, a customer orders a reorderable product from a company. The customer can place this order via a web commerce computer device 320 associated with company by using their user computer device 315 (shown in FIG. 3). The OP computer device 325 receives 105 the order originating from the customer, such as via the web commerce computer device 320. The order includes at least one reorderable product to deliver and account information. The order includes a plurality of information about the customer, such as, but not limited to, address, email, and phone. The OP computer device 325 can receive the order information in one of two ways. In the first way, the web commerce computer device 320 pushes the data to the OP computer device 325, such as via an API. In other embodiments, the OP computer device 325 polls the web commerce computer device 320 for any orders since the last polling.

The OP computer device 325 associates 110 the order with an account associated with the customer. The account information could be for an existing customer or for a new account for a new customer. In some embodiments, the OP computer device 325 associates 110 the order with the account based on the plurality of information in the order. The account information includes a unique customer identifier, an address to ship the product to, and billing information for the customer. The account information is stored in a secure customer database, such as database 345 (shown in FIG. 3). In some embodiments, the billing information and the shipping information is stored in a database 345 associated with the web commerce computer device 320.

In the exemplary embodiment, the OP computer device 325 coordinates the preparation of the order including preparation for shipping the order to the customer. The OP computer device 325 communicates with the shipping computer device 330 to generate 115 a return shipping label with a unique identifier. The unique identifier is stored with and associated with the customer account associated with the order. In some embodiments, the unique identifier is the tracking number for the return shipping label. In other embodiments, the unique identifier is associated with the order number. In still further embodiments, the unique identifier is a combination of the order number and a customer number or identifier. In additional embodiment, the unique identifier may be obfuscated, such as by hashing a number, such as the combination number, and storing the hash results as the unique identifier. In some of these embodiments, the shipping computer device 330 communicates with the shipper computer device 335 to generate the return shipping label. The return shipping label is printed to add to the order.

The OP computer device 325 coordinates the order and OP computer device 325 and/or the shipping computer device 330 ships 120 the order with the return shipping label and an exchange box. The exchange box is designed to return an unused portion of the product. Such as when the product uses a recyclable container that can be reused and/or recycled. For example, the product could be compressed air canisters, where the canisters are recyclable and/or reusable. In some other embodiments, the exchange box is replaced by a reorder postcard or other item, and the return shipping label is applied to the reorder postcard or other item.

The customer receives and uses the product. When the customer has used up the product or is finished, then the customer can place the unused portion or empty container in the exchange box and ship the exchange box using the return shipping label. The return shipping label is scanned by a scanner 340 (shown in FIG. 3) associated with the shipping company. The scanner 340 is in communication with one or more shipper computer devices 335 (shown in FIG. 3). In some embodiments, the one or more shipper computer devices 335 transmit a notification to the OP computer device 325 that the exchange box has been shipped back to the original company (or other location that the returns are transmitted to). In some embodiments, the shipper computer device 335 transmits a notification for different events, such as when a tracking number is first scanned indicating that the box has been picked up by the shipper.

In other embodiments, the shipper computer device 335 transmits a listing of active tracking numbers to the OP computer device 325, such as via an FTP/SFTP file feed. This listing may be transmitted automatically, or the listing may be transmitted upon request via an API call from the OP computer device 325. In some embodiments, the listings or scans are transmitted automatically and the OP computer device 325 polls the shipper computer device 335 for any listings or scans that it might have missed. In these embodiments, the OP computer device 325 may check for new events and/or tracking numbers. The OP computer device 325 receives 125 the message from the shipper computer device 335 indicating that the exchange box with the return shipping label has shipped.

The OP computer device 325 reviews the tracking number to determine 130 a customer account associated with the return label. The OP computer device 325 validates that the order has not already been renewed, such as by the customer renewing online.

In the exemplary embodiment, the OP computer device 325 determines 130 the customer account based on the unique identifier that was added to the return shipping label. The OP computer device 325 looks up the unique identifier in the database 345 to determine 130 the customer account associated with the return shipping label. The OP computer device 325 executes one or more database queries to determine the customer account associated with the return label.

The OP computer device 325 automatically reorders 135 at least a portion of the order for the customer account. In the exemplary embodiment, the OP computer device 325 reorders 135 the portion of the order associated with the recyclable or reusable container. For example, in the case of printer ink cartridges, the OP computer device 325 orders new ink cartridge(s). In the case of gas canisters, then the OP computer device 325 orders one or more new gas canisters. In some embodiments, the OP computer device 325 orders the same amount of product as was in the original order. In other embodiments, the OP computer device 325 orders an amount of product based on the size of the exchange box. For example, if the exchange box can hold two canisters, then two canisters are ordered.

In some embodiments, the OP computer device 325 reorders 135 the product using the web commerce computer device 320, where the shipping and billing information is being stored by the web commerce computer device 320. The customer's billing information is then charged for the product and new product is shipped to them at their shipping address. As a part of the reordering process, the OP computer device 325 generates 115 a return shipping label with a unique identifier. In some embodiments, the unique identifier is reused. In other embodiments, a new unique identifier is generated 115 as outlined above. The OP computer device 325 coordinates the reorder and OP computer device 325 and/or the shipping computer device 330 ships 120 the reorder with the return shipping label and an exchange box. This allows the cycle and reordering process 100 to continue multiple times, depending on how often the customer returns the exchange box.

This complete cycle allows for reordering without having the customer to actively reorder via the user computer device 315 and allows for reordering that only occurs when the user needs more product and is not on a time basis.

Figure 2:
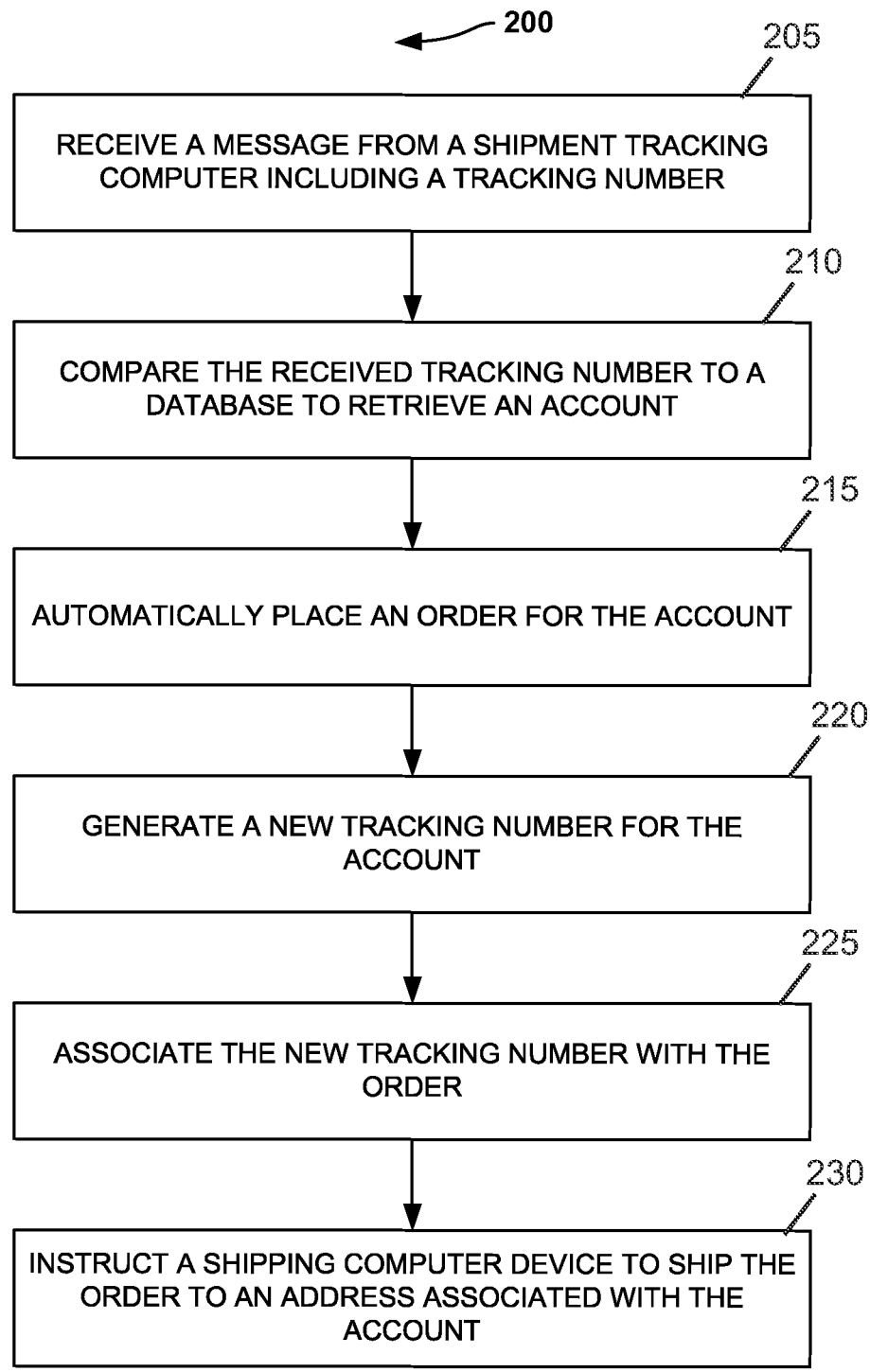
FIG. 2 is a flowchart of a second process for automatic reordering in accordance with at least one embodiment of the disclosure.

FIG. 2 is a flowchart of a second process 200 for automatic reordering in accordance with at least one embodiment of the disclosure. In the exemplary embodiment, process 200 is performed by one or more computing devices, such as but not limited to, a shipping computer device 330 and an order processing (OP) computer device 325 (both shown in FIG. 3).

The OP computer device 235 receives 205 a message from a shipper computer device 335 including a tracking number. The tracking number is for a reorder form/box/item that a customer has submitted to the shipper. The customer submits the reorder form/box/item when the customer has used up the product and wishes to reorder. The OP computer device 235 compares 210 the received tracking number to a database, such as database 345 (shown in FIG. 3) to retrieve account information. In the exemplary embodiment, the database 345 contains customer information including, but not limited to, a unique customer identifier, an address to ship the product to, billing information for the customer, and order history information. The OP computer device 235 is capable of determining which customer account the tracking number is associated with. In the exemplary embodiment, the tracking number was included on a return shipping label that was included with the customer's last order.

Based on the customer's account, the OP computer device 325 automatically places 215 an order for the account. In some embodiments, the customer's account includes preferences, such as, but not limited to, how the customer prefers to reorder, which shipping method to use, which address to use, how many of the product to include in the reorder shipment, and other information about the preferences of the customer. In some embodiments, the customer preferences are entered by the customer. In other embodiments, the customer preferences are determined by the OP computer device 325 or some other computer device, such as by machine learning, based on the historical information of orders from the customer. For example, if the customer changes the number of product that they order based on the month and/or time of year, the preferences may adjust the amount of product to send to the customer for the reorder.

The OP computer device 325 generates 220 a new tracking number for the account and associates 225 the new tracking number with the reorder. The OP computer device 325 instructs 230 a shipping computer device 330 (shown in FIG. 3) to ship the order to an address associated with the account.

Figure 3:
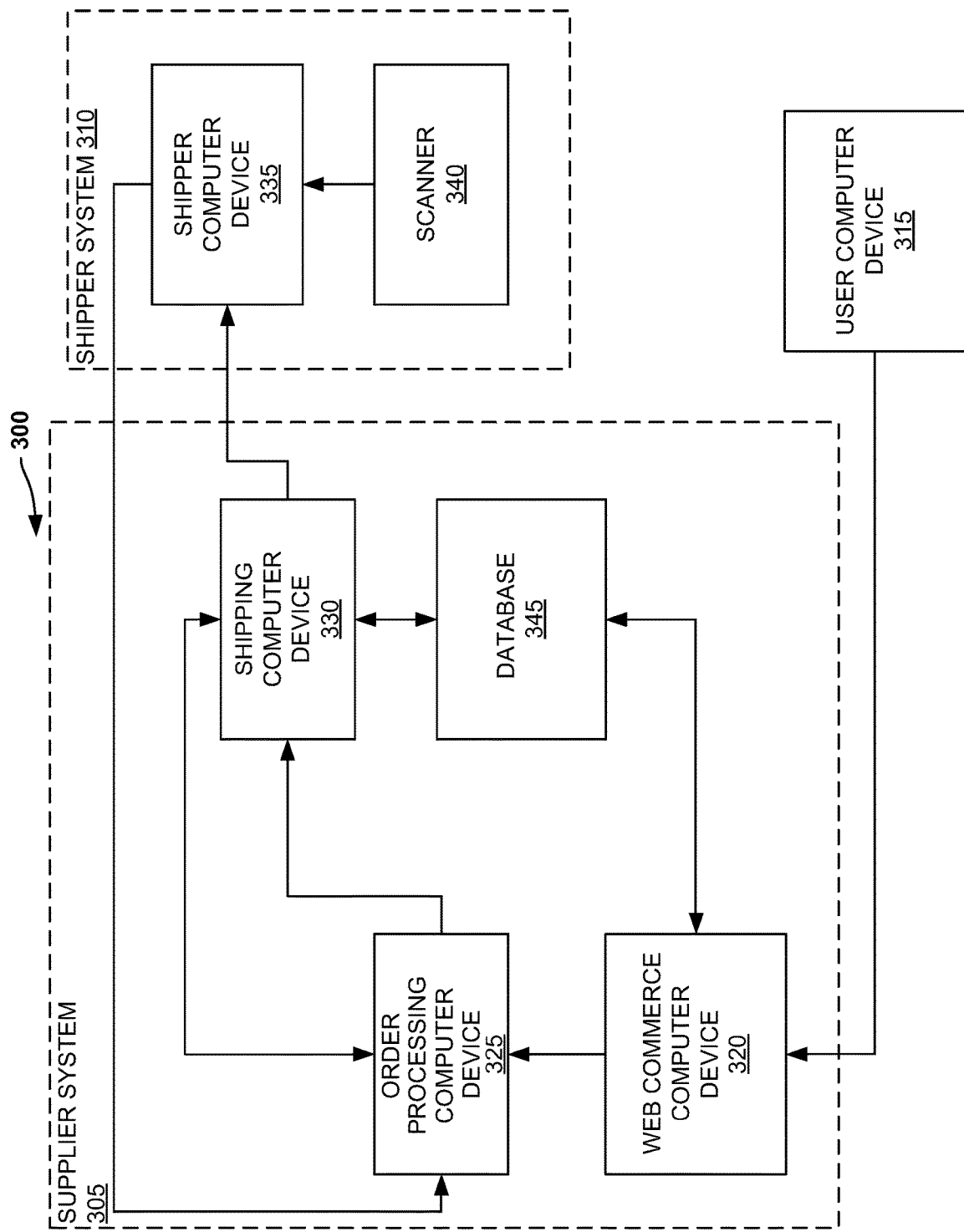
FIG. 3 is a simplified block diagram of a system for automatic reordering for use with the first process and the second process shown in FIGS. 1 and 2.

In another embodiment, a customer orders products through a website, such as through the web commerce computer device 320 (shown in FIG. 3). Each order comes with an exchange box and a return shipping label that is tied to the customer's account information. The return shipping label has a unique identification number and a tracking number that is linked to the customer's original order. This allows the OP computer device 325 to look up the customer's account when the tracking number on the return shipping label is scanned by a shipper.

At time of order the customer billing information and/or shipping information can be stored in at least one of a customer database 345, the web commerce computer device 320, and/or the OP computer device 325.

The customer receives and uses the products received from the reorder. When the customer has a certain number of empty containers/canisters, the customer packages them back in the box that they received from the supplier and drops them in their mailbox, USPS drop point, or other shipping method predetermined by the box and the return shipping label. In some embodiments, the customer is can use a printer associated with their user computer device 315 to print off the return shipping label. This may be available in cases where the customer lost their original return shipping label. In these embodiments, the user computer device 315 communicates with one of the OP computer device 325 and the web commerce computer device 320 to retrieve the return shipping label to print.

The OP computer device 325 receives tracking event updates for all outstanding return labels from the shipper computer device 335 (shown in FIG. 3), such as through a consolidation warehouse FTP file feed. Additionally, as a backup, the OP computer device 325 can pull from the USPS API (or other shipper) on an interval to recapture any missed tracking events from the consolidation warehouse. The OP computer device 325 looks for a particular scan event from the file feeds to activate a renewal. Renewal is activated by finding the customer's subscription in the ecommerce platform and automatically requesting a renewal from the ecommerce platform. Receiving the scan of the tracking number restarts process 200.

In the exemplary embodiment, customer can then expect a charge on their payment card and a package with reordered product to show up within a few days of when they drop off the exchange box/card/item. This can be prior to the company actually receiving their empty canisters/containers.

While the above is described with regards to air canisters or other refillable products, the systems and methods described herein can also be used with other reorderable products, such as, but not limited to, toilet paper, paper towels, coffee, and others.

FIG. 3 is a simplified block diagram of a system 300 for automatic reordering for use with the first process 100 and the second process 200 (shown in FIGS. 1 and 2, respectively). System 300 includes a supplier system 305 which is associated with the retailer of the product(s). The supplier system 305 is in communication with a shipper system 310 for shipping the product(s).

In the exemplary embodiment, user computer device 315 is associated with a user. The user uses the user computer device 315 to order the product(s) through a web commerce computer device 320, such as through an online webpage. The web commerce computer device 320 is in communication with an order processing (OP) computer device 325. Orders are placed via the web commerce computer device 320 and routed to the OP computer device 325. The OP computer device 325 coordinates the order for the product(s). When the order is ready, the OP computer device 325 coordinates with the shipping computer device 330 to have the order shipped. In the exemplary embodiment, the shipping computer device 330 creates a return label for the customer to use to return any containers, etc.

In the exemplary embodiment, the user computer devices 315 are computers that include a web browser or a software application, which enables user computer devices 315 to access remote computer devices, such as web commerce computer device 320, using the Internet or other network. More specifically, user computer device 315 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 315 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, the web commerce computer device 320 is a computer that provides websites to allow users to order products online. The web commerce computer device 320 allows remote computer devices, such as the user computer device 315, to access the web commerce computer device 320, using the Internet or other network. More specifically, web commerce computer device 320 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Web commerce computer device 320 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, the order processing (OP) computer device 325 is a computer that includes a web browser or a software application, which enables the OP computer device 325 to access remote computer devices, such as web commerce computer device 320 and shipping computer device 330, using the Internet or other network. More specifically, OP computer device 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. OP computer device 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, the shipping computer device 330 is a computer that includes a web browser or a software application, which enables the shipping computer device 330 to access remote computer devices, such as OP computer device 325 and shipper computer device 335, using the Internet or other network. More specifically, shipping computer device 330 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Shipping computer device 330 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the shipping computer device 330 includes a printer for printing the return shipping label.

In the exemplary embodiment, the shipper computer device 335 is a computer that includes a web browser or a software application, which enables the shipper computer device 335 to access remote computer devices, such as shipping computer device 330, using the Internet or other network. More specifically, shipper computer device 335 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Shipper computer device 335 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. The shipper computer device 335 is associated with the shipper that receives and scans the exchange box/card/item.

In the exemplary embodiment, the scanner 340 is a computer that includes a web browser or a software application, which enables the scanner 340 to access remote computer devices, such as shipper computer device 335, using the Internet or other network. In the exemplary embodiment, the scanner 340 includes a camera or laser scanner that is capable of capturing bar codes and/or QR codes, such as those on shipping labels. More specifically, scanner 340 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Scanner 340 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the scanner 340 is associated with the shipper. In the exemplary embodiment, the scanner 340 is used by a delivery driver or at by a shipping location clerk that scans the return shipping label when the accompanying exchange box/card/item is submitted to be returned to the supplier.

One or more of the aforementioned computer device are in communication with one or more databases 345. For example, each of the supplier system 305 and the shipper system 310 may have their own databases 345. In one embodiment, the databases 345 may include order information, shipping information, customer information, and a listing of issued return labels. In some embodiments, the database 345 may be stored remotely from the OP computer device 325 and/or the shipper computer device 335. In some embodiments, the database 345 may be decentralized. In the exemplary embodiment, the user may access the database 345 via the user computer device 315, as described herein.

Figure 4:
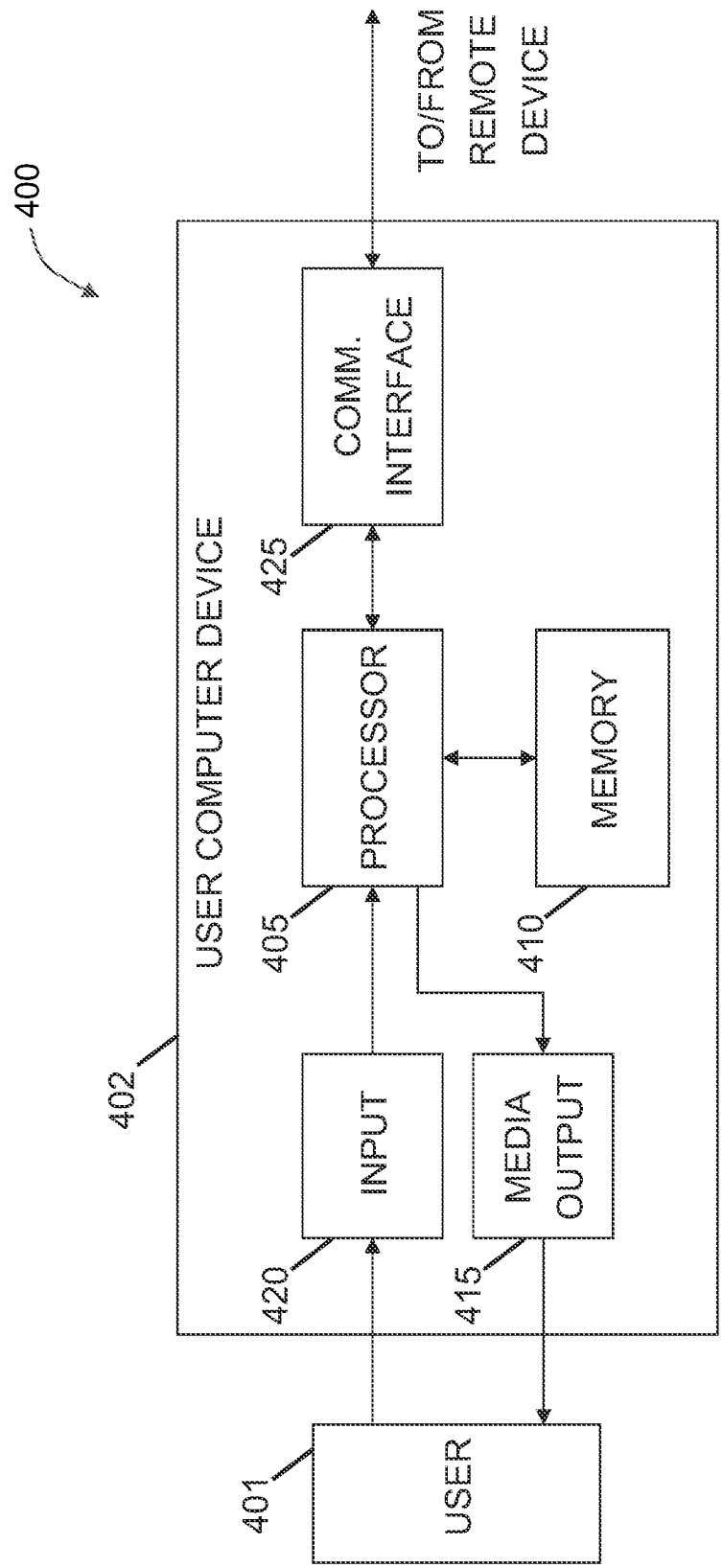
FIG. 4 illustrates an exemplary configuration of a user computer device, in accordance with one embodiment of the present disclosure.

FIG. 4 depicts an exemplary configuration 400 of user computer device 402, in accordance with one embodiment of the present disclosure. In the exemplary embodiment, user computer device 602 may be similar to, or the same as, and user computer device 315 (shown in FIG. 3). User computer device 402 may be operated by a user 401. User computer device 602 may include, but is not limited to, web commerce computer device 320, OP computer device 325, shipping computer device 330, shipper computer device 335, scanner 340, (all shown in FIG. 3), and user computer device 315. User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or repair data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing products to order, orders that have been placed, shipping information, and/or reorder information. In some embodiments, user computer device 402 may include an input device 420 for receiving input from user 401. User 401 may use input device 420 to, without limitation, acknowledge receiving shipping and/or reordering information.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as shipper computer device 335. Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from web commerce computer device 320. A client application may allow user 401 to interact with, for example, web commerce computer device 320. For example, instructions may be stored by a cloud service, and the output of the execution of the instructions sent to the media output component 415.

Figure 5:
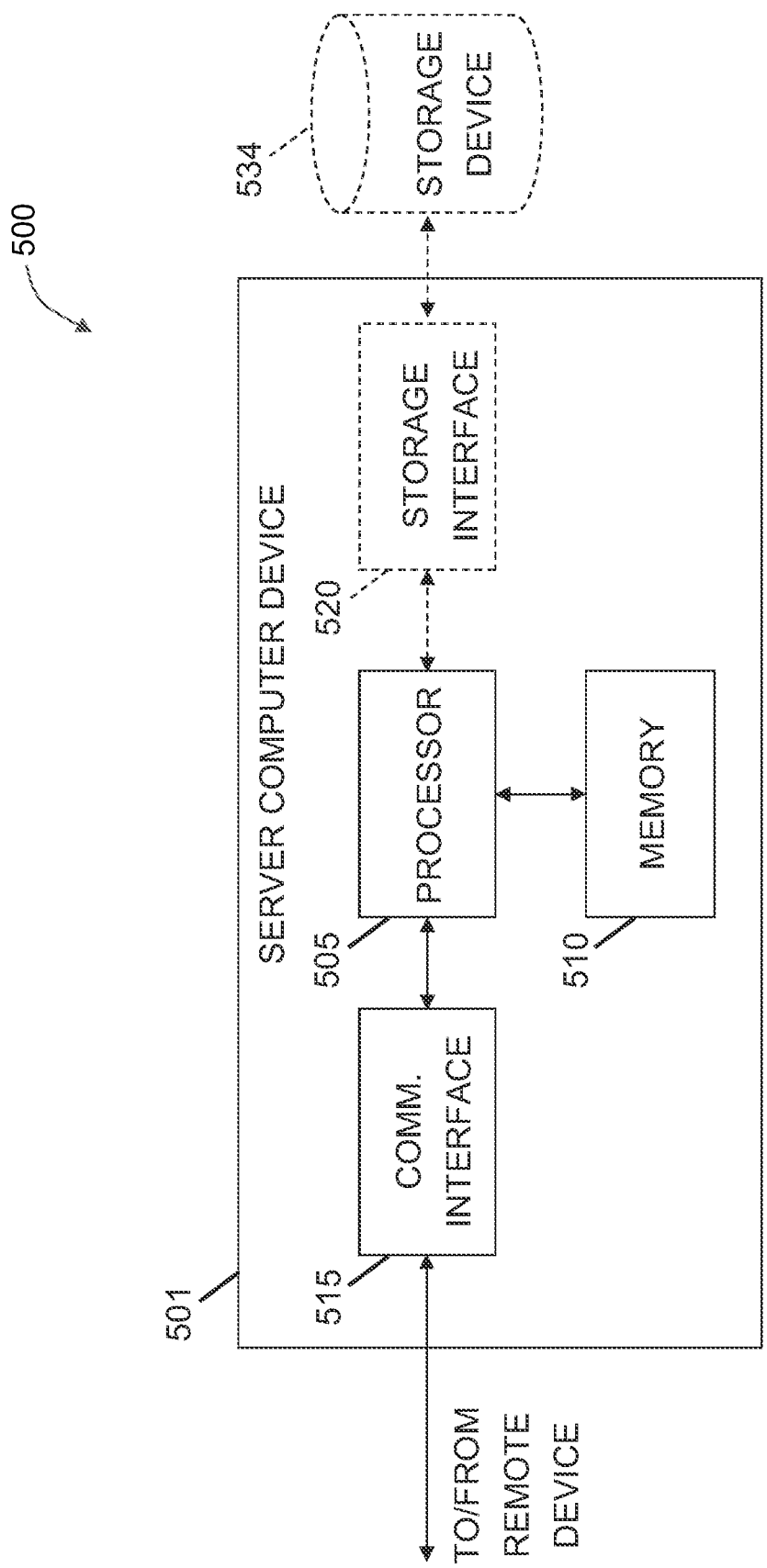
FIG. 5 illustrates an exemplary configuration of a server computer device, in accordance with one embodiment of the present disclosure.

FIG. 5 depicts an exemplary configuration 500 of a server computer device 501, in accordance with one embodiment of the present disclosure. Server computer device 501 may include, but is not limited to, web commerce computer device 320, OP computer device 325, shipping computer device 330, shipper computer device 335, and scanner 340 (all shown in FIG. 3). Server computer device 501 may also include a processor 505 for executing instructions. Instructions may be stored in a memory device 510. Processor 505 may include one or more processing units (e.g., in a multi-core configuration).

Processor 505 may be operatively coupled to a communication interface 515 such that server computer device 501 is capable of communicating with a remote device such as another server computer device 501, web commerce computer device 320, OP computer device 325, shipping computer device 330, shipper computer device 335, scanner 340, and user computer devices 315 (shown in FIG. 3) (for example, using wireless communication or data transmission over one or more radio links or digital communication channels). For example, communication interface 515 may receive requests from user computer devices 315 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with a database. In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIGS. 1 and 2.

In the exemplary embodiment, the system 300 includes the OP computer device 325 (both shown in FIG. 3). The OP computer device 325 includes at least one processor 505 in communication with at least one memory device 510 (both shown in FIG. 3), at least one database 345, and a shipper computer device 335 associated with a shipper. The at least one processor of the OP computer device 325 receives an order from a customer for a product. The order is associated with a customer account associated with the customer. The product can be multiple products and can include consumable items in reusable containers, such as CO2 gas cannisters. The OP computer device 325 receives the order from a web commerce computer device 320 (shown in FIG. 3). The customer placed the order via the web commerce computer device 320.

The OP computer device 325 performs at least one advanced programming interface (API) call to retrieve a unique identification number from the shipper computer device 335. In some embodiments, the API call is performed by the shipping computer device 330 (shown in FIG. 3). In some embodiments, the shipping computer device 330 is a part of the OP computer device 325. In other embodiments, the shipping computer device 330 is in communication with the OP computer device 325. In some embodiments, the unique identification number is a tracking number assigned to the return shipping label.

The OP computer device 325 and/or the shipping computer device 330 generates and prints a return shipping label with the unique identification number. In some embodiments, the OP computer device 325 associates the unique identification number with the order. The OP computer device 325 stores the unique identification number in the at least one database 345 with the customer account.

The OP computer device 325 and/or the shipping computer device 330 generates and provides instructions to ship the order with the return shipping label and an exchange box. The exchange box includes one or more empty reusable containers when shipped by the customer The OP computer device 325 receives, from the shipper computer device 335 via at least one of an API call and a push notification, a message indicating that the exchange box with the return shipping label has shipped. The message includes the unique identification number. The shipper computer device 335 receives scan information of a scan of the return shipping label, when the exchange box is shipped by the customer. The scan can be performed by the scanner 340 (shown in FIG. 3).

The OP computer device 325 generates one or more database queries to retrieve customer account information from the at least one database 345 based on the unique identification number. In some embodiments, the OP computer device 325 generates the one or more database queries to search the at least one database 345 using the unique identification number as a key variable.

The OP computer device 325 compares results of the one or more database queries to identify the customer account associated with the unique identification number.

The OP computer device 325 generates a reorder for at least a portion of the order for the customer account in response to receiving the message. The amount of products in the reorder is based on a number of reusable containers that may fit in the exchange box and a number of products in the order.

In some embodiments, the order is for one or more consumable products and the exchange box is an exchange postcard. In these embodiments, the return shipping label is attached to the exchange postcard.

In still further embodiments, the OP computer device 325 and/or the shipping computer device 330 performs at least one advanced programming interface (API) call to retrieve a new unique identification number from the shipper computer device 335 for the reorder. The OP computer device 325 and/or the shipping computer device 330 generates and prints a reorder return shipping label with the new unique identification number. The OP computer device 325 and/or the shipping computer device 330 generates and provides instructions to ship the reorder with the reorder return shipping label and a reorder exchange box.

At a subsequent time, the OP computer device 325 receives, from the shipper computer device 335 via at least one of an API call and a push notification, a second message indicating that the reorder exchange box with the reorder return shipping label has shipped. The second message includes the new unique identification number. The OP computer device 325 generates one or more database queries to retrieve customer account information from the at least one database 345 based on the new unique identification number. The OP computer device 325 compares the results of the one or more database queries to identify the customer account associated with the new unique identification number. The OP computer device 325 generates a second reorder for at least a portion of the reorder for the customer account in response to receiving the second message.

In some additional embodiments, the OP computer device 325 receives, from the shipper computer device 335 via at least one of an API call and a push notification, a first message indicating that a first return shipping label has shipped. The first message includes a first unique identification number. The OP computer device 325 generates one or more database queries to retrieve customer account information from the at least one database 345 based on the first unique identification number. The OP computer device 325 compare results of the one or more database queries to identify a customer account associated with the first unique identification number. The OP computer device 325 generates a first reorder for at least a portion of a previous order for the customer account in response to receiving the first message. The OP computer device 325 performs at least one advanced programming interface (API) call to retrieve a second unique identification number from the shipper computer device for the first reorder. The OP computer device 325 generates and prints a second reorder return shipping label with the second unique identification number. The OP computer device 325 generates and provides instructions to ship the first reorder with the second reorder return shipping label and a first reorder exchange box.

The OP computer device 325 receives, from the shipper computer device 335 via at least one of an API call and a push notification, a second message indicating that the first reorder exchange box with the second reorder return shipping label has shipped. The second message includes the second unique identification number. The OP computer device 325 generates one or more database queries to retrieve customer account information from the at least one database 345 based on the second unique identification number. The OP computer device 325 compares results of the one or more database queries to identify the customer account associated with the second unique identification number. The OP computer device 325 generates a second reorder for at least a portion of the first reorder for the customer account in response to receiving the second message.

In some further embodiments, the shipper computer device 335 receives scan information of a scan of the first reorder return shipping label, when an associated reorder exchange box is shipped by the customer. In other embodiments, the shipper computer device 335 receives scan information of a scan of the second reorder return shipping label, when the first reorder exchange box is shipped by the customer.

In some further embodiments, the first reorder and the second reorder are for one or more products in reusable containers and wherein the first reorder exchange box includes one or more empty reusable containers when shipped by the customer. The amount of products in the second reorder is based on a number of reusable containers that may fit in the first reorder exchange box and a number of products in the first reorder.

In still further embodiments, the first reorder is for one or more consumable products and the first reorder exchange box is an exchange postcard, wherein the second reorder return shipping label is attached to the exchange postcard when shipped by the customer.

In additional embodiments, the first unique identification number is a tracking number assigned to the first reorder return shipping label.

In still additional embodiments, the OP computer device 325 associates the second unique identification number with the first reorder. The OP computer device 325 stores the second unique identification number in the at least one database 345 with the customer account.

In further embodiments, the OP computer device 325 generates the one or more database queries to search the at least one database 345 using at least one of the first unique identification number or the second unique identification number as a key variable The system 300 may have additional, less, or alternate functionality, including that discussed elsewhere herein.

Additional Considerations

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., shipping information, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The exemplary systems and methods described and illustrated herein therefore significantly increase the accuracy of reordering systems and improve the user's recycling behavior while reducing costs.

The present systems and methods are further advantageous over conventional techniques the embodiments herein are not confined to a single type of product and/or situation but may instead allow for versatile operation within multiple different types of products, including, but not limited to toilet paper, paper towels, coffee, and others. Accordingly, these novel techniques are of particular value to consumable product manufacturers who desire to have these methods and systems available for the users of their customers.

Exemplary embodiments of systems and methods for improved reordering are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising a computer device comprising at least one processor in communication with at least one memory device, at least one database, and a shipper computer device associated with a shipper, wherein the at least one processor is programmed to:
   receive an order from a customer for one or more products in reusable containers, wherein the order is associated with a customer account associated with the customer;
   execute at least one advanced programming interface (API) call to the shipper computer device to retrieve a unique identification number from the shipper computer device;
   generate and print a return shipping label with the unique identification number;
   generate and provide instructions to ship the order with the return shipping label and an exchange box configured to include one or more empty reusable containers;
   receive, from the shipper computer device via at least one of an API call and a push notification, a message indicating that the exchange box with the return shipping label has shipped, wherein the message includes the unique identification number, wherein the customer has not actively reordered via a user computer device since the order from the customer prior to receiving the message;
   generate one or more database queries to retrieve customer account information from the at least one database based on the unique identification number;
   compare results of the one or more database queries to identify the customer account associated with the unique identification number; and
   generate a reorder for at least a portion of the order for the customer account in response to receiving the message.

2. The system in accordance with claim 1, wherein the at least one processor is further programmed to receive the order from a web commerce computer device, wherein the customer placed the order via the web commerce computer device.

3. The system in accordance with claim 1, wherein an amount of products in the reorder is based on a number of reusable containers that may fit in the exchange box and a number of products in the order.

4. The system in accordance with claim 1, wherein the order is for one or more consumable products and the exchange box is an exchange postcard, wherein the return shipping label is attached to the exchange postcard.

5. The system in accordance with claim 1, wherein the shipper computer device receives scan information of a scan of the return shipping label, when the exchange box is shipped by the customer.

6. The system in accordance with claim 1, wherein the unique identification number is a tracking number assigned to the return shipping label.

7. The system in accordance with claim 1, wherein the at least one processor is further programmed to:
   associate the unique identification number with the order; and
   store the unique identification number in the at least one database with the customer account.

8. The system in accordance with claim 1, wherein the at least one processor is further programmed to generate the one or more database queries to search the at least one database using the unique identification number as a key variable.

9. The system in accordance with claim 1, wherein the at least one processor is further programmed to:
   execute at least one advanced programming interface (API) call to the shipper computer device to retrieve a new unique identification number from the shipper computer device for the reorder;
   generate and print a reorder return shipping label with the new unique identification number;
   generate and provide instructions to ship the reorder with the reorder return shipping label and a reorder exchange box configured to include one or more empty reusable containers;
   receive, from the shipper computer device via at least one of an API call and a push notification, a second message indicating that the reorder exchange box with the reorder return shipping label has shipped, wherein the second message includes the new unique identification number, wherein the customer has not actively reordered via a user computer device since the receiving the message from the customer prior to receiving the second message;
   generate one or more database queries to retrieve customer account information from the at least one database based on the new unique identification number;
   compare results of the one or more database queries to identify the customer account associated with the new unique identification number; and
   generate a second reorder for at least a portion of the reorder for the customer account in response to receiving the second message.

10. A computer device comprising at least one processor in communication with at least one memory device, at least one database, and a shipper computer device associated with a shipper, wherein the at least one processor is programmed to:
    receive, from the shipper computer device via at least one of an API call and a push notification, a first message indicating that a first reorder return shipping label has shipped, wherein the first message includes a first unique identification number, wherein the computer device has not received any customer interaction from a customer associated with a customer account associated with the first unique identification number prior to receiving the first message;
    generate one or more database queries to retrieve customer account information from the at least one database based on the first unique identification number;
    compare results of the one or more database queries to identify the customer account associated with the first unique identification number;
    generate a first reorder for at least a portion of a previous order for the customer account in response to receiving the first message, wherein the previous order included one or more products in reusable containers;
    execute at least one advanced programming interface (API) call to the shipper computer device to retrieve a second unique identification number from the shipper computer device for the first reorder;
    generate and print a second reorder return shipping label with the second unique identification number;
    generate and provide instructions to ship the first reorder with the second reorder return shipping label and a first reorder exchange box configured to include one or more empty reusable containers;
    receive, from the shipper computer device via at least one of an API call and a push notification, a second message indicating that the first reorder exchange box with the second reorder return shipping label has shipped, wherein the second message includes the second unique identification number, wherein the customer has not actively reordered via a user computer device the first message prior to receiving the second message;
    generate one or more database queries to retrieve customer account information from the at least one database based on the second unique identification number;
    compare results of the one or more database queries to identify the customer account associated with the second unique identification number; and
    generate a second reorder for at least a portion of the first reorder for the customer account in response to receiving the second message.

11. The computer device in accordance with claim 10, wherein the shipper computer device receives scan information of a scan of the first reorder return shipping label, when an associated reorder exchange box is shipped by the customer.

12. The computer device in accordance with claim 10, wherein the first reorder and the second reorder are for one or more products in reusable containers and wherein the first reorder exchange box includes one or more empty reusable containers when shipped by the customer.

13. The computer device in accordance with claim 12, wherein an amount of products in the second reorder is based on a number of reusable containers that may fit in the first reorder exchange box and a number of products in the first reorder.

14. The computer device in accordance with claim 10, wherein the first reorder is for one or more consumable products and the first reorder exchange box is an exchange postcard, wherein the second reorder return shipping label is attached to the exchange postcard when shipped by the customer.

15. The computer device in accordance with claim 10, wherein the shipper computer device receives scan information of a scan of the second reorder return shipping label, when the first reorder exchange box is shipped by the customer.

16. The computer device in accordance with claim 10, wherein the first unique identification number is a tracking number assigned to the first reorder return shipping label.

17. The computer device in accordance with claim 10, wherein the at least one processor is further programmed to:
   associate the second unique identification number with the first reorder; and
   store the second unique identification number in the at least one database with the customer account.

18. The computer device in accordance with claim 10, wherein the at least one processor is further programmed to generate the one or more database queries to search the at least one database using at least one of the first unique identification number or the second unique identification number as a key variable.

19. A method implemented by a computer device comprising at least one processor in communication with at least one memory device, at least one database, and a shipper computer device associated with a shipper, wherein the method comprises:
   receiving an order from a customer for one or more products in reusable containers, wherein the order is associated with a customer account associated with the customer;
   executing at least one advanced programming interface (API) call to the shipper computer device to retrieve a unique identification number from the shipper computer device;
   generating and print a return shipping label with the unique identification number;
   generating and providing instructions to ship the order with the return shipping label and an exchange box configured to include one or more empty reusable containers;
   receiving, from the shipper computer device via at least one of an API call and a push notification, a message indicating that the exchange box with the return shipping label has shipped, wherein the message includes the unique identification number, wherein the customer has not actively reordered via a user computer device the order from the customer prior to receiving the message;
   generating one or more database queries to retrieve customer account information from the at least one database based on the unique identification number;
   comparing results of the one or more database queries to identify the customer account associated with the return shipping label; and
   generating a reorder for at least a portion of the order for the customer account in response to receiving the message.

* * * * *